United States Patent
Sedlmayr

(10) Patent No.: US 7,877,225 B2
(45) Date of Patent: Jan. 25, 2011

(54) METHOD FOR DETERMINING MEASURING POINTS

(75) Inventor: Andreas Sedlmayr, Friedberg (DE)

(73) Assignee: Kuka Roboter GmbH (DE)

( * ) Notice: Subject to any disclaimer, the term of this patent is extended or adjusted under 35 U.S.C. 154(b) by 0 days.

(21) Appl. No.: 12/515,556

(22) PCT Filed: Jan. 25, 2008

(86) PCT No.: PCT/EP2008/050880

§ 371 (c)(1), (2), (4) Date: May 20, 2009

(87) PCT Pub. No.: WO2008/098826

PCT Pub. Date: Aug. 21, 2008

(65) Prior Publication Data

US 2009/0281649 A1  Nov. 12, 2009

(30) Foreign Application Priority Data

Feb. 15, 2007 (DE) .................. 10 2007 007 574

(51) Int. Cl.
*G06F 17/50* (2006.01)
(52) U.S. Cl. .................................... 702/152
(58) Field of Classification Search ............ 702/152
See application file for complete search history.

(56) References Cited

U.S. PATENT DOCUMENTS

2004/0133382 A1  7/2004  Ban et al.
2006/0181236 A1  8/2006  Brogardh

FOREIGN PATENT DOCUMENTS

JP  06307842  11/1994

OTHER PUBLICATIONS

Fan Zhang, InSAR Imaging Geometry Simulation Based on Computer Graphics, National Key Laboratory of Microwave Imaging Technology, Institute of Electronics, Chinese Academy of Sciences, Lab 1, No. 19 Beisihuan Xilu P.O.Box 2702, Beijing 100190 P. R. China, zhangfan1998@hotmail.com, p. 781-784, 2008.*
Bernard C. Jiang, Journal of Intelligent Manufacturing, Form tolerance-based measurement points determination with CMM, vol. 13, No. 2, p. 101-108, 2002.*

* cited by examiner

*Primary Examiner*—Tung S Lau
(74) *Attorney, Agent, or Firm*—Schiff Hardin LLP

(57) ABSTRACT

In a method for determining measurement points on a physical object, a number of measurement points are first selected in a graphical computer model of the object, until a sufficient number of measuring points have been selected so as to allow the position and orientation (lay) of the object to be determined relative to a reference system. A further measuring point of the object is then selected in the graphical computer model, and a check is automatically made to determine whether the further measuring point can determine the lay of the object relative to the reference coordinate system more accurately. If so, the further measuring point is used for this determination. Further measuring points are selected and checked in this manner, until the lay of the object can be determined better than with a predefined tolerance.

11 Claims, 3 Drawing Sheets

METHOD FOR DETERMINING MEASURING POINTS

BACKGROUND OF THE INVENTION

1. Field of the Invention

The present invention concerns a method to determine measuring points on an object.

2. Description of the Prior Art

In order to determine the bearing (i.e. the position and orientation) of an object relative to a reference coordinate system, WO 2004/0171717 A1 discloses to register and to store a number of measuring points on the surface of the object, to determine the orientation and the position of a CAD model of the object relative to a coordinate system of the industrial robot via correlation of the measuring points relative to the model, and to determine a resulting deviation for at least some of the measuring points and the corresponding points in the model.

According to this it is necessary to designate multiple measuring points on the subject or, respectively, to determine measurement points that are initially suitable and satisfactory in the first place.

SUMMARY OF THE INVENTION

An object of the invention is to provide a method to determine measuring points on a subject for a determination of the bearing (position and orientation) of the subject relative to a reference coordinate system, such that allows suitable measuring points to be determined in a relatively simple manner.

The object is achieved by a method to determine measuring points on an object that includes the following method steps:

a) selection of multiple measuring points of a physical object in a graphical computer model of the physical object until sufficient measuring points are selected in order to determine the bearing of the object with regard to a reference coordinate system, wherein a computer program automatically determines when sufficient measuring points are selected, b) after sufficient measuring points have been selected for the determination of the bearing of the object, selection of an additional measuring point of the object in a graphical computer model, and automatic checking by means of the computer program as to whether the bearing of the object can be determined more precisely with regard to the reference coordinate system via the additional measuring point, c) consideration of the additional measuring point for the determination of the bearing of the object when the bearing can be better determined via the additional measuring point and d) repetition of the method steps b) and c) until the bearing of the object can be determined better than with a predetermined tolerance.

In specific applications, it is necessary to determine the bearing (i.e. the position and orientation, or the situation or arrangement in space) of an object with regard to a reference coordinate system. One example of such an application is the determination of the bearing of an object relative to an industrial robot or relative to its reference coordinate system. An object is, for example, a work piece that should be processed with the industrial robot.

The bearing of the object can be determined by means of the measuring points at the object that are scanned or approached for the determination of the bearing as such, for example with sensors (for example laser scanning sensors, laser scanners, measuring pins or cameras).

The method according to the invention is set up to select or to determine generally suitable and in particular optimally well suited measuring points in sufficient number on an object so that the determination of the bearing can actually be implemented.

According to the invention, this is implemented with the use of the computer model of the physical object.

The computer model is in particular a CAD (Computer Aided Design) computer model that, according to one variant of the method according to the invention, is stored in a control device of an industrial robot. For example, the computer model is a wireframe model.

According to the invention, the measuring points are selected on the computer model. For example, this is possible in that the computer model is displayed by means of a display device and an operator subsequently marks points on the computer model as measuring points by means of an input device, for example a computer mouse.

So that the operator marks only those points on the computer model that a measurement device (for example a sensor) can actually reach on the physical object, it can be provided to already highlight possible measuring points on the computer model, or to provide a list of possible measuring points from which the operator can select potential measuring points.

According to the invention, sufficient measuring points are initially selected on the computer model so that in principle the bearing of the object can be determined relative to the reference coordinate system. This is checked automatically by means of the computer program so that the operator can be reliably informed when sufficiently many measuring points are selected. If the object can move in six degrees of freedom, the measuring points must be suitable to determine the bearing of the object in six degrees of freedom. For example, if the object can be moved relative to fewer than six degrees of freedom due to a predetermined position or orientation, correspondingly fewer measuring points are required in order to determine the bearing of the object.

According to one embodiment of the method according to the invention, the sufficient number of selected measuring points is checked in that the following Jacobian matrix J is determined:

$$J = \frac{\partial \begin{pmatrix} S_1 \cdot F(\vec{x}_0, \vec{x}data_1) \\ S_2 \cdot F(\vec{x}_0, \vec{x}data_2) \\ \ldots \\ S_n \cdot F(\vec{x}_0, \vec{x}data_n) \end{pmatrix}}{\partial x}$$

wherein $$F(\vec{x}_0, \vec{x}data) = (S\ 0) \left( T(x) \cdot \begin{pmatrix} xdata_1 \\ xdata_2 \\ xdata_3 \\ 1 \end{pmatrix} \right)$$

$$= \begin{pmatrix} Tx \\ Ty \\ Tz \end{pmatrix} + R(Rx, Ry, Rz) \cdot \vec{x}data$$

wherein T is a transformation matrix that transforms coordinates of the object into coordinates of a coordinate system that is associated with the measurement device used for the measuring points of the object; $\vec{x}data_{1; 2; \ldots n}$ are the coordinates of the measuring points that have been selected in the computer model so far; S is a selection matrix that depend on measurement axes of the employed measurement device;

$$\begin{pmatrix} Tx \\ Ty \\ Tz \end{pmatrix}$$

describes the translation of the homogeneous transformation matrix T; R represents a rotation matrix that describes the rotation of the transformation matrix T; n is the number of selected measuring points; and $$\vec{x}_0 = \begin{pmatrix} 0 \\ 0 \\ 0 \\ 0 \\ 0 \\ 0 \end{pmatrix}.$$

The values of the aforementioned Jacobian matrix J correspond to no exact metric (i.e. uniform physical meaning) due to the combination of translation quantities and rotation quantities in the variable x. A weighting of J with an invertible diagonal matrix that is known from the literature is conducted to derive reasonable indices from the Jacobian matrix (for example the condition). The Jacobian matrix J is to be understood in a suitable weighted form in the subsequent text.

The rank of the Jacobian matrix J is subsequently checked and additional measuring points are selected until the rank of the Jacobian matrix J corresponds to at least equal to the number of possible degrees of freedom of the object.

For example, if all six degrees of freedom of the object must be determined, the rank of the Jacobian matrix J must then be at least six so that the bearing of the object relative to the reference coordinate system can be determined.

This variant of the method according to the invention proceeds from the following consideration:

In order to obtain the bearing of the object relative to the reference coordinate system, a target function $f(\vec{x})$ of a non-linear, over-determined optimization problem can be presented in the coordinate system of the measurement device due to the not-absolutely-necessary 3 DoF ("degree of freedom") measurement values of said measurement device since, given measuring points $\vec{y}data_i$ on the object, no transformation into a different 3D coordinate system is possible with fewer than 3 DoF.

The following optimization problem thus results:

$$\min_{x} f(\vec{x})$$

wherein $$f(\vec{x}) = \sum_i v_i^T v_i$$

with $$v_i = S_i \cdot F(\vec{x}, \vec{x}data_i) - \vec{y}data_i$$

and $$F(\vec{x}, \vec{x}data) = (S\ 0) T(x) \cdot \begin{pmatrix} \begin{pmatrix} xdata_1 \\ xdata_2 \\ xdata_3 \\ 1 \end{pmatrix} \end{pmatrix}$$

$$= \begin{pmatrix} Tx \\ Ty \\ Tz \end{pmatrix} + R(Rx, Ry, Rz) \cdot \vec{x}data$$

wherein $$\vec{x} = \begin{pmatrix} Tx \\ Ty \\ Tz \\ Rx \\ Ry \\ Rz \end{pmatrix}$$

are 6D coordinates in what is known as the fixed angle convention.

For example, given the calculation of the norm $\min f(\vec{x})$ the distance from the selected point to a plane, a length of a 3D vector point-point or point-line is drawn upon.

The selection matrix S results from the selected measurement device.

If the measurement device is a measurement device that determines a three-dimensional measurement value (d=3), as this is the case given a robot touch-up, for example, the selection matrix then is as follows:

$$S = \begin{pmatrix} 1 & 0 & 0 \\ 0 & 1 & 0 \\ 0 & 0 & 1 \end{pmatrix}$$

The corresponding coordinates of the measuring point at the object are:

$$\vec{y}data = \begin{pmatrix} x_m \\ y_m \\ z_m \end{pmatrix}$$

If the measurement device is a measurement device that determines a two-dimensional measurement value (d=2), as this is the case given a 2D camera as a measurement device, for example, the selection matrix then is as follows:

$$S = \begin{pmatrix} 1 & 0 & 0 \\ 0 & 1 & 0 \end{pmatrix}$$

The corresponding coordinates of the measuring point at the object are:

$$\vec{y}data = \begin{pmatrix} x_m \\ y_m \end{pmatrix}$$

If the measurement device is a measurement device that determines a one-dimensional measurement value (d=1), as this is the case given a laser distance sensor, for example, the selection matrix then is as follows:

$$S = (1\ 0\ 0)$$

The corresponding coordinate of the measuring point at the object are:

$$\vec{y}\,data = (z_m)$$

The Jacobian matrix J can thus be created as:

$$J = \frac{\partial \begin{pmatrix} S_1 \cdot F(\vec{x}, \vec{x}data_1) \\ S_2 \cdot F(\vec{x}, \vec{x}data_2) \\ \ldots \\ S_n \cdot F(\vec{x}, \vec{x}data_n) \end{pmatrix}}{\partial x}$$

with number of rows or, respectively, 1D measurement values $$m = \sum_i d_i.$$

With a decomposition of the Jacobian matrix J, evaluations can be conducted without prior measurements on the object, meaning that no measurements need to be conducted on the object for the method according to the invention (thus for the determination of the suitable measuring points on the object), which is why the measuring points $\vec{y}data_1$ on the object are also not necessary.

It is thus possible to set the input variable $\vec{x}$ for the Jacobian matrix J to $\vec{x}_0$ (unitary transformation) so that the coordinate axes of the reference coordinate system fall in the coordinate system of the object.

The Jacobian matrix can subsequently be analyzed in order, for example, to obtain information about whether sufficient measuring points have already been selected so that the bearing of the object can be determined. This in particular ensues via a transformation of the range of rank of the Jacobian matrix J.

After sufficient measuring points have been selected so that the bearing of the object can be determined, according to the invention the additional measuring point is selected in order to possibly improve the precision of the determination of the bearing. If the determination of the bearing can be improved by the additional measuring point, this measuring point is likewise taken into account for the determination of the bearing. Otherwise this additional measuring point is not considered. Furthermore, additional measuring points are selected until the bearing of the object can be determined with the predetermined tolerance.

According to one embodiment of the method according to the invention, for this what is known as the condition of the geometric point arrangement of the Jacobian matrix J before the selection of the additional measuring point is compared with the condition of the Jacobian matrix J after the selection of the additional measuring point. If the condition has become smaller, the relevant additional measuring point is taken into account.

In the condition the largest singular value is set in relation to the smallest singular value of the Jacobian matrix J. The best possible condition is theoretically 1.0, i.e. given orthogonal measuring points. Poorer conditions theoretically go to infinity.

According to the invention, the method steps b) and c) are repeated until the bearing of the object can be determined better than with the predetermined tolerance. According to one variant of the method according to the invention, this is provided when the condition of the Jacobian matrix J falls below a predetermined value. This predetermined value is advantageously between 2.0 and 10.0 and, according to one embodiment of the method according to the invention, is 5.0.

According to one embodiment of the method according to the invention, this possesses the following additional method steps:

e) after sufficient measuring points have been determined so that the bearing of the object can be determined better than with the predetermined tolerance, determination by means of the computer program of whether the bearing of the object can be determined within a predetermined measurement tolerance by means of a measurement device provided to measure the object by means of the measuring points, and f) repetition of the method steps b) through e) until the bearing of the object can be determined by means of the measurement device within the predetermined measurement tolerance.

According to this variant, the measurement tolerance of the employed measurement device is thus also used for the determination of advantageous measuring points.

Alternatively, the tolerance of the method step a) can also be the measurement tolerance of the provided measurement device.

According to an additional variant of the method according to the invention, the measurement points and the considered additional measurement points are displayed and/or output.

According to an additional embodiment of the method according to the invention, the measuring points and the additionally considered measuring points are output and/or displayed organized according to relevance with regard to measurement.

It is still subsequently possible to select the best suited measuring points and take into account additional measuring points for the measurement at the object in order to organize the output and/or displayed measuring points and additional measuring points according to measurement relevance.

For example, this is possible in the following manner:

For example, the Jacobian matrix J is decomposed by means of triangular decomposition with row association, for example by means of QR decomposition according to Householder, with a m×m permutation matrix P with m row substitutions being created according to criteria of numerical stability. The condition of the Jacobian matrix remains unchanged, such that $$Q \cdot R \cdot P = J,$$

wherein Q and R are likewise matrices.

The one-dimensional measurement values of the (1D, 2D or 3D) measuring points necessary for optimal solving can be determined from the permutation matrix P. The remaining measurement values are not necessary in order to calculate the transformation. However, due to the measurement precisions in practice they can lead to a better result due to the redundancy.

The row number i of the necessary equations (i.e. the index of the necessary one-dimensional measurement values) can be learned from the permutation matrix P. The list of the suitable measuring points results from this.

According to one variant of the method according to the invention, the measuring points and a number of additional measuring points are selected from a number of possible measuring points before the implementation of the method step a).

The measuring points and the additional measuring point can possess the following correspondences: point to point; point to plane; point to edge; and/or point to line.

The method according to the invention supports an operator in the configuration of measuring points, for example for work piece bearing measurement. For this the method according to the invention can also be executed such that the operators request the following information with every newly selected measuring point:
- Is the number of measuring points sufficient to determine the work piece bearing (in particular 6 degrees of freedom)?
- Which of the selected measuring points are superfluous/redundant or, respectively, which lead to a better or even best possible work piece bearing determination in terms of measurement?
- Which degree of freedom or which degrees of freedom of the work piece bearing cannot yet be determined, or cannot yet be determined with sufficient measurement precision? A visual display by "sweeping" the computer model along the still free axis or axes can support the operator in the selection of a new, additional measuring point.
- If the number of measuring points is sufficient: which tolerance (for example 95% confidence interval) of the work piece bearing results due to the known measurement tolerance of the measurement device? Doe the measuring points already selected yield an advantageous spatial arrangement in terms of measurement?

DESCRIPTION OF THE PREFERRED EMBODIMENTS

Figure 1:
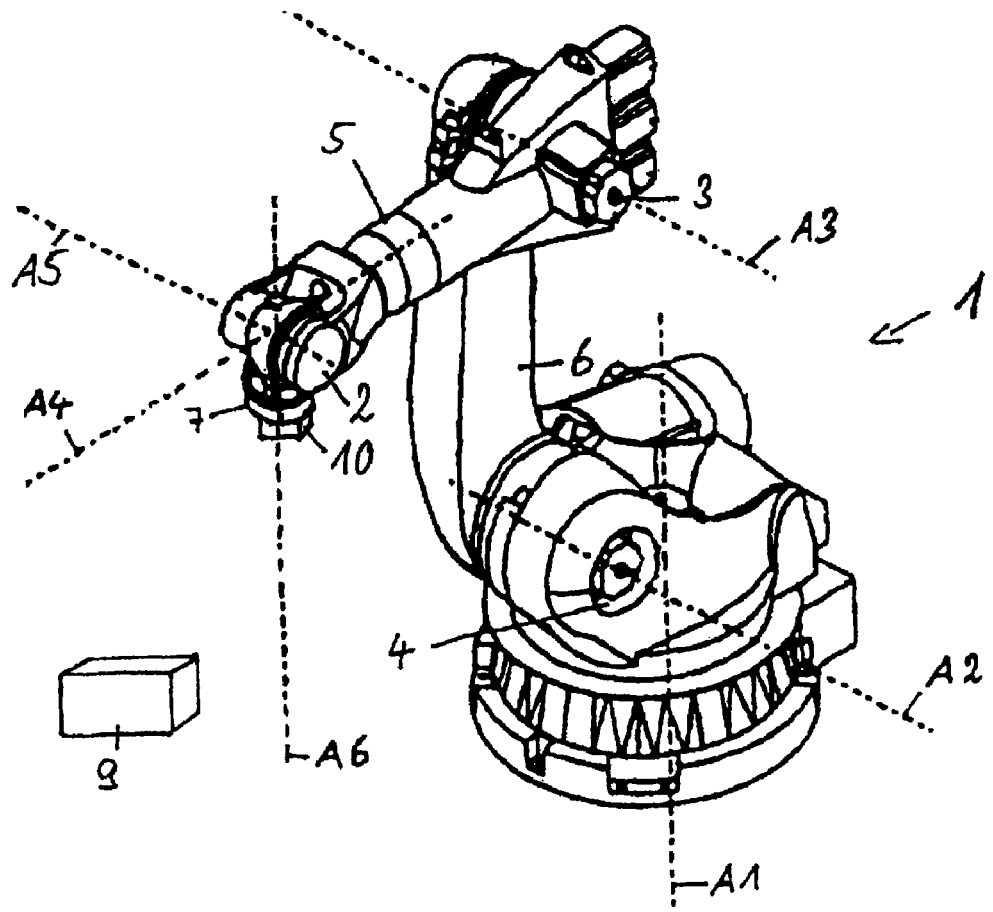
FIG. 1 schematically illustrates an industrial robot suitable for implementing the method according to the present invention.
Figure 1:
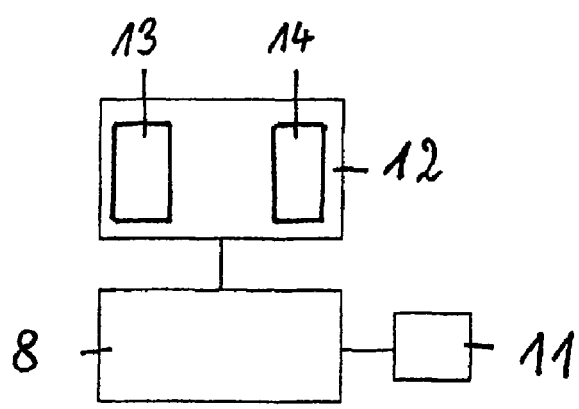

FIG. 1 shows a 6-axis industrial robot 1 with kinematics for movements in six degrees of freedom. In a generally known manner, the industrial robot 1 has articulations 2 through 4, arms 5, 6, six movement axes A1 through A6 and a flange 7.

Each of the axes A1 through A6 is moved by an actuator (not shown in detail). For example, each of the actuators has an electrical motor and gearing, as is generally known to those skilled in the art.

The industrial robot 1 also has a control computer 8 that controls the actuators of the industrial robot 1 in a generally known manner by means of a computer program running on the control computer 8.

In the exemplary embodiment, the industrial robot 1 is provided to process an object that, in the case of the present exemplary embodiment, is a fender 9 with a work piece (not shown in the figures) fastened on a flange 7. During the processing of the fender 9 with the work piece, the control device 8 controls the industrial robot 1. So that this is possible, the bearing of the fender 9—i.e. its position and orientation relative to the industrial robot 1, in particular relative to its reference coordinate system—must be known. In order to determine the bearing of the fender 9 relative to the reference coordinate system, the industrial robot 1 can take up measuring points on the fender 9 in a generally known manner.

Figure 2:
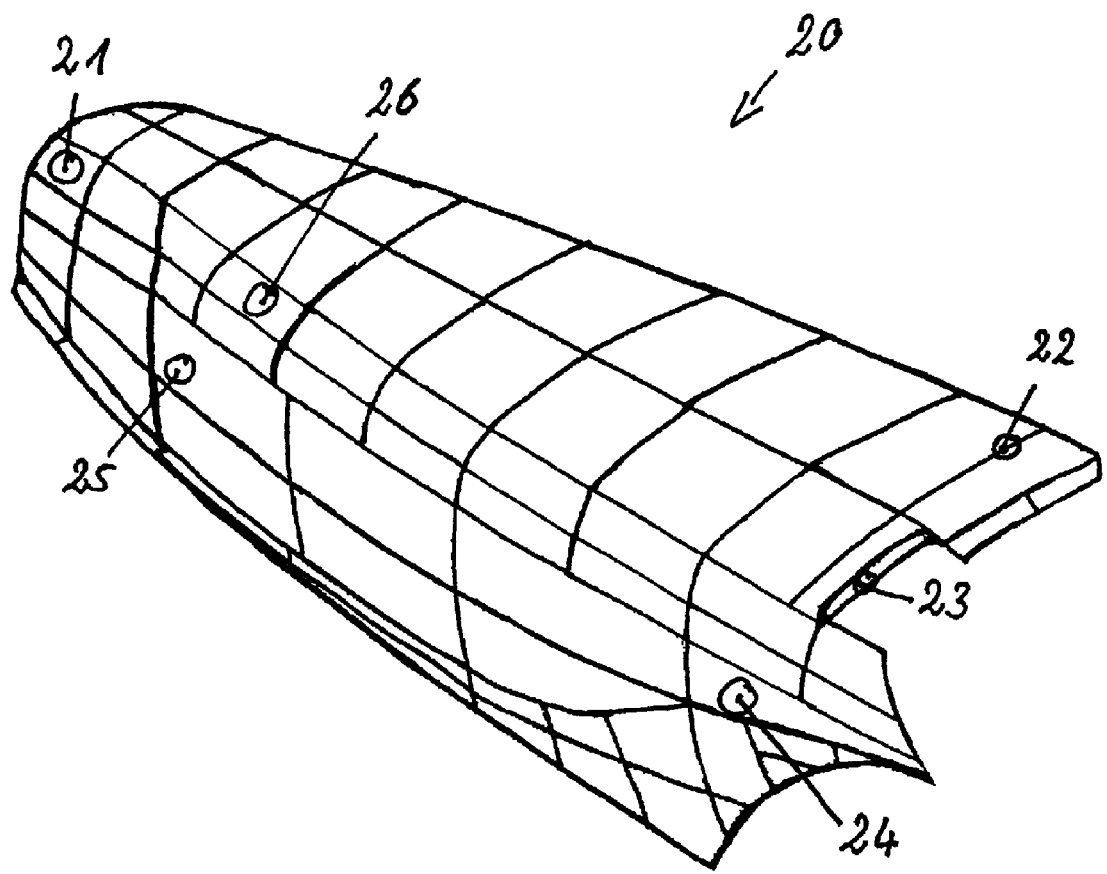
FIG. 2 illustrates a computer model of a fender for explaining the inventive method.

In order to determine suitable measuring points on the fender 9, in the case of the present exemplary embodiment a CAD (Computer Aided Design) model 20 (shown in detail in FIG. 2) of the fender 9 is stored in the control computer 8, which model 20 can be displayed with a display device 12 connected with the control computer 8.

In the case of the present exemplary embodiment, the model 20 is what is known as a wireframe model in which vertices of an object (thus of the fender 9 in the present case) are connected with one another by lines, or real edges of the body are shown. Wireframe models are generally known in 3-dimensional presentation in computer graphics.

Figure 3:
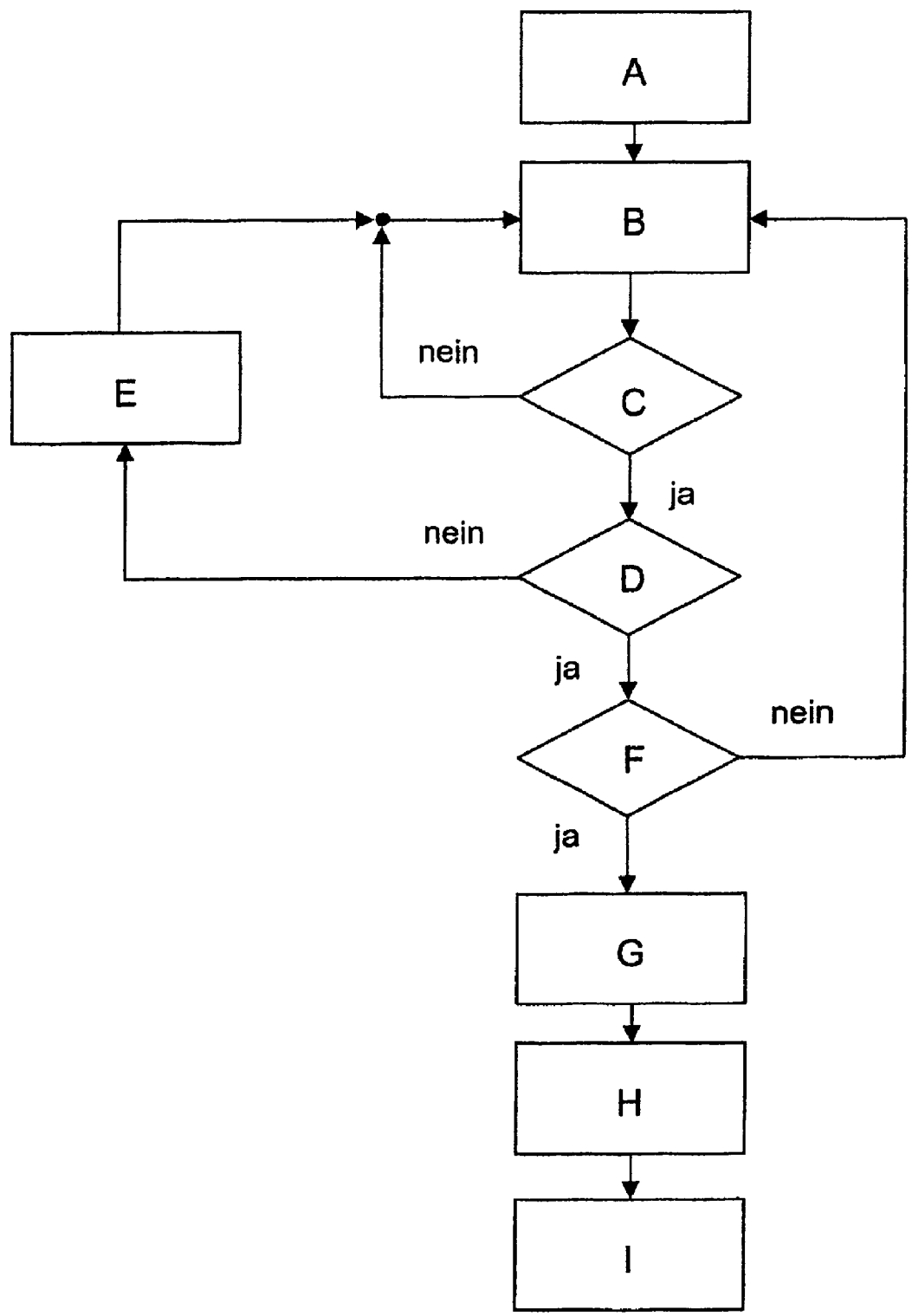
FIG. 3 is a flowchart of an embodiment of the method according to the present invention.

Using a flow diagram, FIG. 3 illustrates the method to determine measuring points that are suitable for the determination of the bearing of the fender 9.

The geometries of the fender 9 are initially imported into a CAD (Computer Aided Design) program (Step A of the flow diagram). The CAD program thereupon generates the CAD model 20 of the fender 9. The CAD program can run on the control computer 8 or on an external computer (not shown in detail in Figures).

After importing the geometries of the fender 9, its CAD model 20 is presented by means of the display device 12 connected with the control computer 8 or by means of a display device (not shown in detail) of the external computer. An operator (not shown in detail in Figures) thereupon selects in the CAD model 20 a measuring point 21 and configures the number of the degrees of freedom to be measured and the position, relative to the coordinate system of the fender 9, of a measurement device 10 attached on the flange 7 for the measurement of the fender 9. Depending on the employed measurement device 10, one degree of freedom, or two or three degrees of freedom, can be selected for the measurement (Step B of the flow diagram).

In the case of the present exemplary embodiment, the operator selects the measuring point 12 by means of a computer mouse 11 (as an example of an input device) connected with the control device 8 in that she moves a cursor (overlaid in the display device 12 but not shown in detail) and clicks on the corresponding point in the CAD model 20, whereby the measuring point 21 is selected.

A computer program running on the control computer 8 or, respectively, on the external computer thereupon automatically checks whether the number of selected measuring points is sufficient to determine the bearing of the fender 9, and whether all degrees of freedom of the bearing of the fender 9 can be determined (Step C of the flow diagram).

In the case of the present exemplary embodiment, this step ensues via analysis of the following Jacobian matrix J:

$$J = \frac{\partial \begin{pmatrix} S_1 \cdot F(\vec{x}_0, \vec{x}data_1) \\ S_2 \cdot F(\vec{x}_0, \vec{x}data_2) \\ \ldots \\ S_n \cdot F(\vec{x}_0, \vec{x}data_n) \end{pmatrix}}{\partial x}$$

wherein $$F(\vec{x}_0, \vec{x}data) = (S \ 0) \left( T(x) \cdot \begin{pmatrix} xdata_1 \\ xdata_2 \\ xdata_3 \\ 1 \end{pmatrix} \right)$$

$$= \begin{pmatrix} Tx \\ Ty \\ Tz \end{pmatrix} + R(Rx, Ry, Rz) \cdot \vec{x}data$$

wherein T is a transformation matrix that transforms coordinates of the fender 9 into coordinates of a coordinate system that is associated with the measurement device used for the measuring points of the fender 9; $\vec{x}data_{1;\ 2;\ \ldots\ n}$ are the coordinates of the measuring points that have been selected in the CAD model 20 so far; S is a selection matrix that depend on measurement axes of the employed measurement device 10;

$$\begin{pmatrix} Tx \\ Ty \\ Tz \end{pmatrix}$$

describes the translation of the transformation matrix T; R represents a rotation matrix that describes the rotation of the transformation matrix T; n is the number of selected measuring points; and $$\vec{x}_0 = \begin{pmatrix} 0 \\ 0 \\ 0 \\ 0 \\ 0 \\ 0 \end{pmatrix}.$$

The selection matrix S results from the selected measurement device 10.

If the measurement device 10 is a measurement device that determines a three-dimensional measurement value, as this is the case given a robot touch-up, for example, the selection matrix then is:

$$S = \begin{pmatrix} 1 & 0 & 0 \\ 0 & 1 & 0 \\ 0 & 0 & 1 \end{pmatrix}$$

If the measurement device 10 is a measurement device that determines a two-dimensional measurement value, as this is the case given a camera as a measurement device, for example, the selection matrix then is:

$$S = \begin{pmatrix} 1 & 0 & 0 \\ 0 & 1 & 0 \end{pmatrix}$$

If the measurement device 10 is a measurement device that determines a one-dimensional measurement value, as this is the case given a laser distance sensor, for example, the selection matrix then is:

$$S = (1 \ 0 \ 0)$$

The computer program subsequently checks the rank of the Jacobian matrix J.

In the case of the present exemplary embodiment, the fender 9 can be moved in six degrees of freedom. The position of the fender 9 can therefore be determined when the rank of the Jacobian matrix J is at least equal to "6".

If the rank of the Jacobian matrix J is less than "6", in the case of the present exemplary embodiment the operator is then requested (by means of a message overlaid on the display device 12) to select an additional measuring point in the CAD model 20, which is the case in the event of the present exemplary embodiment.

The operator thereupon selects an additional measuring point 22 in the CAD model 20 and configures the number of degrees of freedom to be measured and the position of the measurement device 10 with regard to the coordinate system of the fender 9 (Step B of the flow diagram).

The computer program thereupon automatically checks whether sufficient measuring points are now selected in the CAD model 20 so that the bearing of the fender 9 can be determined (Step C of the flow diagram).

In the case of the present exemplary embodiment, this step is now executed in that the Jacobian matrix J is again set up for the measuring points selected up to now, thus for the measuring points 21, 22, and their rank is determined.

Steps B and C of the flow diagram are subsequently repeated until sufficient measuring points are selected in the CAD model 20 so that the bearing of the fender 9 can be determined. This is the case when the rank of the Jacobian matrix J is at least equal to "6" and, in the case of the present exemplary embodiment, measuring points 23, 24 are selected in the CAD model 20 in addition to the measuring points 21, 22.

In the case of the present exemplary embodiment, a message appears on the display device 12 when sufficient measuring points 21-24 are selected in the CAD model 20.

The operator subsequently selects an additional measuring point 25 in the CAD model 20 in order possibly achieve a measurement-related improvement for the determination of the bearing of the fender 9 (Step D of the flow diagram).

If the additional measuring point 25 yields no improvement of the determination of the bearing of the fender 9, the additional measuring point 25 is discarded (Step E of the flow diagram) and Steps B-D are implemented again.

In the case of the present exemplary embodiment, Step D is realized in that the computer program compares what is known as the condition of the geometric point arrangement of the Jacobian matrix J before the selection of the additional measuring point 25 with the condition of the Jacobian matrix J after the selection of the additional measuring point 25. If the condition has become smaller, the relevant additional measuring point 25 is taken into account; otherwise it is discarded (Step E).

In addition, it is provided in the case of the present exemplary embodiment to repeat Step D until the bearing of the fender 19 can be determined with a predetermined tolerance. This is the case in the event of the present exemplary embodiment when the condition of the Jacobian matrix J falls below a specific threshold that, for example, is in the range between 2.0 and 10.0 and is 5.0 for the present exemplary embodiment.

In the case of the present exemplary embodiment, this is achieved when the operator has selected the additional measuring point 25 and a further measuring point 26 in the CAD model 20. The operator is informed about this with a corresponding message overlaid on the display device 12.

In the case of the present exemplary embodiment, the computer program automatically checks whether the bearing of the fender 9 with the selected measuring points 21-26 can be determined with the measurement device 10 within a required precision due to a measurement tolerance of the measurement device 10 (Step G of the flow diagram). If this is not possible, Steps B-F are repeated.

Otherwise, in the case of the present exemplary embodiment a list 13 that indicates the measuring points 21-26 according to measurement relevance is displayed with the display device 12 in Step G of the flow diagram.

In the case of the present exemplary embodiment, Step G is executed in that the computer program decomposes the Jacobian matrix J based on the measuring points 21-26 by means of triangular decomposition with row association (for example by means of QR decomposition according to Householder), whereby a m×m permutation matrix P with m row substitutions arises according to criteria of numerical stability. The condition of the Jacobian matrix remains unchanged, such that $$Q \cdot R \cdot P = J,$$

wherein Q and R are likewise matrices.

The one-dimensional measurement values of the (1D, 2D or 3D) measuring points 21-26 necessary for optimal solving are determined from the permutation matrix P.

The row number i of the necessary equations (=index of the necessary one-dimensional measurement values) can be learned from the permutation matrix P. The list 13 of the suitable measuring points results from this.

The fender 9 can accordingly be measured by means of the measurement device 10 due to the measuring points 21-26 (Step H of the flow diagram), and the calculation of the bearing of the fender can be indicated with a specification of the confidence variable, for example 95% (Step I of the flow diagram).

In the described exemplary embodiment, the operator selects the measuring points 21-26 in the CAD model 20 by clicking. For example, in order to prevent that the operator selects a measuring point that cannot be reached with the measurement device 10, it can be provided to highlight possible measuring points in the CAD model 20 that are to be selected in color, or to overlay a list 14 that indicates possible measuring points to be selected in the display device 12 before the selection of the measuring points 21-26.

The operator can select the measuring points 21-26 in succession from the list 14. However, it is also possible that the operator selects multiple potential measuring points (for example from the list 14) at the beginning, and the computer program subsequently selects one of the potential measuring points after another to determine the suitable measuring points in Step B of the flow diagram until the suitable measuring points 21-26 have been determined.

According to one variant of the method according to the invention, the measuring points and a number of additional measuring points are selected from a number of possible measuring points before the implementation of the method step a).

The measuring points and the additional measuring point can possess the following correspondences: point to point; point to plane; point to edge; and/or point to line.

The method according to the invention supports an operator in the configuration of measuring points, for example for work piece bearing measurement. For this purpose, the method according to the invention can also be executed such that the operators request the following information with every newly selected measuring point.

Although modifications and changes may be suggested by those skilled in the art, it is the intention of the inventor to embody within the patent warranted heron all changes and modifications as reasonably and properly come within the scope of his contribution to the art.

I claim:

1. Method to determine measuring points on an object, comprising the steps of:
   a) providing a computerized processor with a graphical computer model of a physical object;
   b) through a user interface, providing said processor with a designation of multiple measuring points of the physical object in the graphical computer model until a number of said measuring points has been designated in order to define the position and orientation of the object with regard to a reference coordinate system, and executing a computer program in said processor to automatically determine when said number of measuring points has been designated,
   c) after said number of measuring points has been designated to define the position and orientation of the object with regard to the reference coordinate system, designating an additional measuring point of the object in the graphical computer model in said processor, and automatically checking in the execution of the computer program as to whether the position and orientation of the object can be determined more precisely with regard to the reference coordinate system using the additional measuring point by,
   generating a Jacobian matrix J $$J = \frac{\partial \begin{pmatrix} S_1 \cdot F(\vec{x}_0, \vec{x}data_1) \\ S_2 \cdot F(\vec{x}_0, \vec{x}data_2) \\ \ldots \\ S_n \cdot F(\vec{x}_0, \vec{x}data_n) \end{pmatrix}}{\partial x}$$

wherein $$F(\vec{x}_0, \vec{x}data) = (S \ 0) \left( T(x) \cdot \begin{pmatrix} xdata_1 \\ xdata_2 \\ xdata_3 \\ 1 \end{pmatrix} \right)$$

wherein T is a transformation matrix that transforms coordinates of the object into coordinates of a coordinate system that is associated with a measurement device used for the measuring points of the object;

$\vec{x}\text{data}_{1;2;\ldots,n}$ are the coordinates of the measuring points in the computer model; S is a selection matrix that depends on measurement axes of the measurement device (10); and $$\vec{x}_0 = \begin{pmatrix} 0 \\ 0 \\ 0 \\ 0 \\ 0 \\ 0 \end{pmatrix}$$

and checking the rank of the Jacobian matrix J and selection of measuring points until the rank of the Jacobian matrix J is at least equal to the number of possible degrees of freedom of the object;

d) providing a humanly perceptible indication from said processor at said user interface when using the additional measuring point for the determination of the position and orientation of the object with regard to the reference coordinate system can be more precisely determined using the additional measuring point;

e) providing said processor with a predetermined tolerance and repeating steps c) and d) and after each repetition, automatically checking in said processor whether said position and orientation of the object have been determined better than said predetermined tolerance and providing a further humanly perceptible indication from said processor at said interface when said position and orientation of said object have been determined better than said predetermined tolerance.

2. Method according to claim 1 comprising selecting the measuring points and of the additional measuring point from a list of possible measuring points and/or marking the measuring points and of the additional measuring points in the computer model.

3. Method according to claim 1 comprising emphasizing possible measuring points in the computer model.

4. Method according to claim 1, comprising comparing the condition of the geometric point arrangement of the Jacobian matrix J before designating the additional measuring point with the condition of the Jacobian matrix J after designating the additional measuring point; and using the additional measuring point when the condition of the geometric point arrangement of the Jacobian matrix J before designating the additional measuring point is greater than the condition of the Jacobian matrix J after designating the additional measuring point.

5. Method according to claim 1 comprising repeating steps c) and d) until the condition of the Jacobian matrix J falls below a predetermined value.

6. Method according to claim 1 comprising:

f) after said number of measuring points has been determined so that the position and orientation of the object can be determined better than with the predetermined tolerance, executing the computer program to determine whether the position and orientation of the object (9) can be determined within a predetermined measurement tolerance by a measurement device used to measure the object by means of the measuring points, and g) repeating the method steps c) through f) until the bearing of the object can be determined by means of the measurement device within the predetermined measurement tolerance.

7. Method according to claim 1 comprising designating the measuring points and a plurality of additional measuring points from a plurality of possible measuring points before implementation of step b).

8. Method according to claim 1 comprising designating the measuring points and the additional measuring point so as to have a correspondence selected from the group consisting of point to point; point to plane; point to edge; and point to line.

9. A method as claimed in claim 1 comprising supplying the graphical computer model, embodying the number of measurement points that resulted in the further indication in step e), to a control unit of an industrial robot and automatically controlling operation of said industrial robot using the computer model supplied thereto.

10. Method according to claim 5, comprising employing a value between 2.0 and 10.0 as said predetermined value.

11. Method to determine measuring points on an object, comprising the steps of:

a) providing a computerized processor with a graphical computer model of a physical object;

b) through a user interface, providing said processor with a designation of multiple measuring points of the physical object in the graphical computer model until a number of said measuring points has been designated in order to define the position and orientation of the object with regard to a reference coordinate system, and executing a computer program in said processor to automatically determine when said number of measuring points has been designated, c) after said number of measuring points has been designated to define the position and orientation of the object with regard to the reference coordinate system, designating an additional measuring point of the object in the graphical computer model in said processor, and automatically checking in the execution of the computer program as to whether the position and orientation of the object can be determined more precisely with regard to the reference coordinate system using the additional measuring point, d) providing a humanly perceptible indication from said processor at said user interface when using the additional measuring point for the determination of the position and orientation of the object with regard to the reference coordinate system can be more precisely determined using the additional measuring point;

e) providing said processor with a predetermined tolerance and repeating steps c) and d) and after each repetition, automatically checking in said processor whether said position and orientation of the object have been determined better than said predetermined tolerance and providing a further humanly perceptible indication from said processor at said interface when said position and orientation of said object have been determined better than said predetermined tolerance; and f) displaying or outputting the measurement points and the used additional measurement points at said user interface and organizing the output or the display of the measuring points and the used additional measuring points at said user interface according to relevance with regard to measurement, and determining the measuring points and the used additional measuring points by QR decomposition of a Jacobian matrix J.

\* \* \* \* \*